S. C. BEALE & A. B. KNIGHT.
BEET HARVESTER.
APPLICATION FILED MAR. 8, 1917.

1,272,604.

Patented July 16, 1918.
5 SHEETS—SHEET 2.

Witnesses:
Lully Russo
Little A. Alter

Inventors
Samuel C. Beale
Anna B. Knight
By Frederick Whyou atty

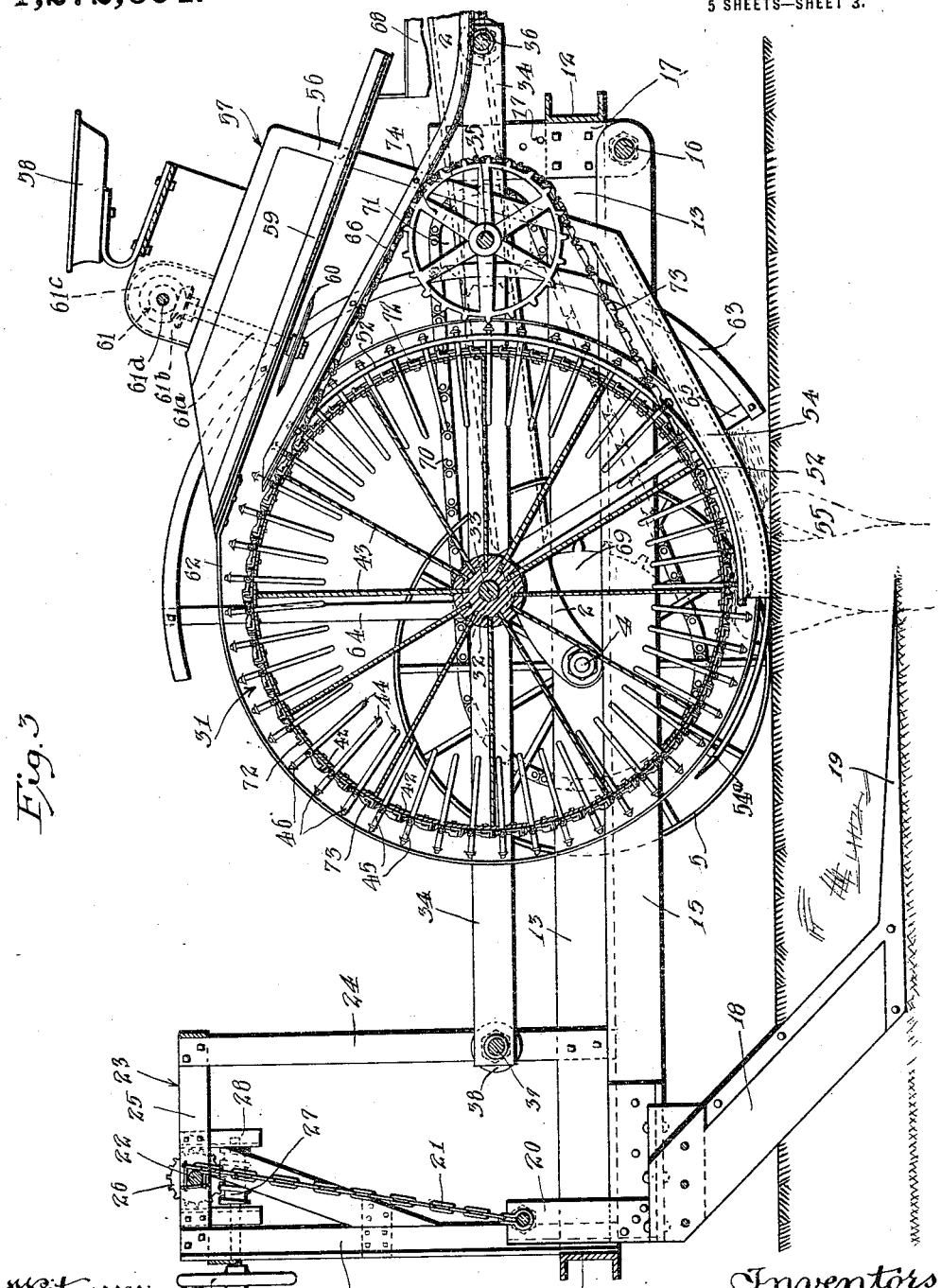

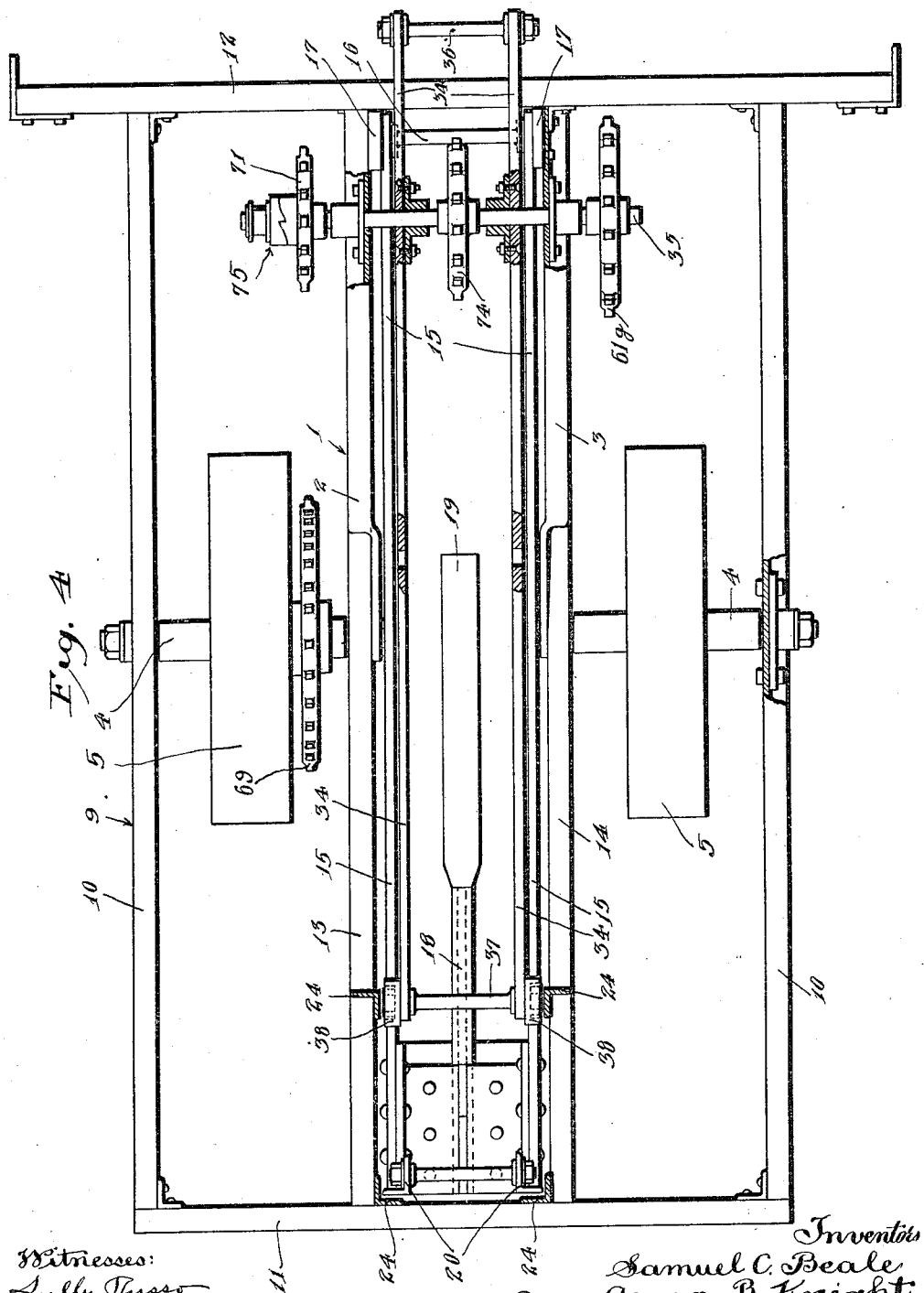

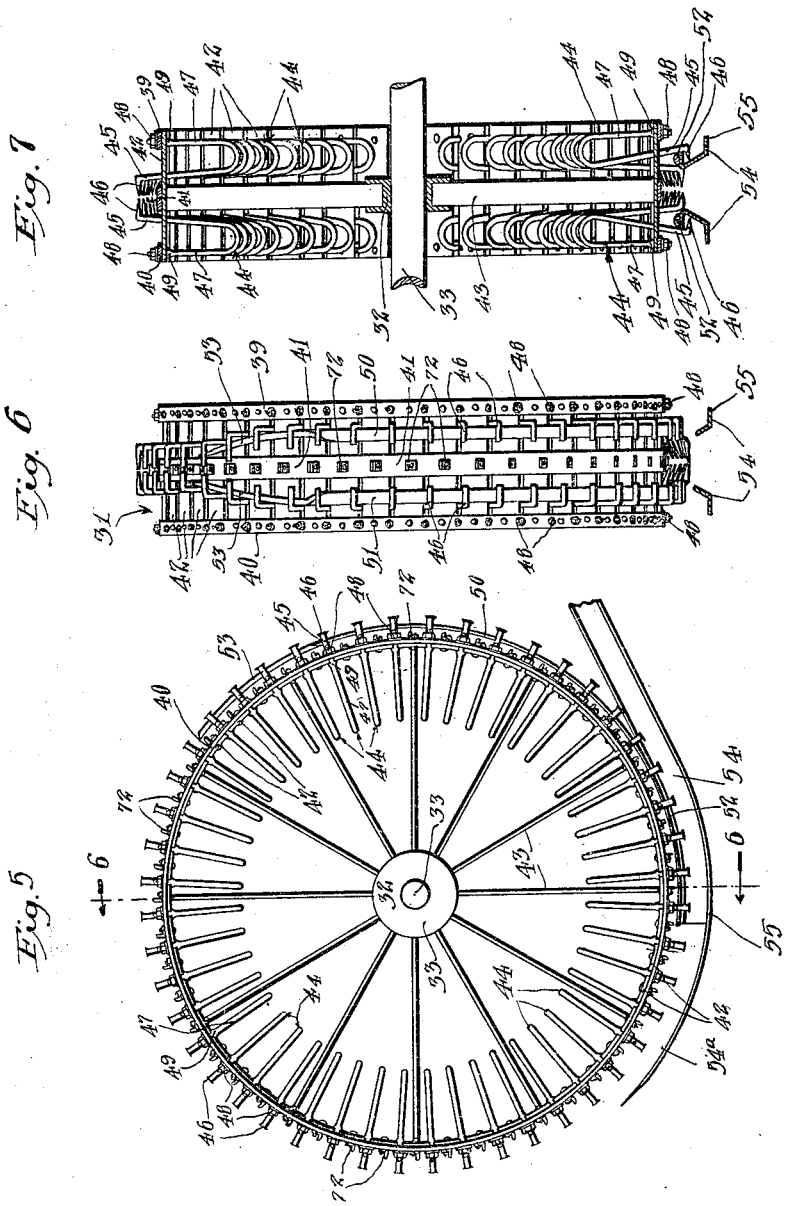

UNITED STATES PATENT OFFICE.

SAMUEL C. BEALE AND ANNA B. KNIGHT, OF LOS ANGELES, CALIFORNIA, ASSIGNORS, BY DIRECT AND MESNE ASSIGNMENTS, TO AMERICAN BEET HARVESTER COMPANY, OF SANTA ANA, CALIFORNIA, A CORPORATION OF CALIFORNIA.

BEET-HARVESTER.

1,272,604.  Specification of Letters Patent.  Patented July 16, 1918.

Application filed March 8, 1917. Serial No. 153,261.

*To all whom it may concern:*

Be it known that we, SAMUEL C. BEALE and ANNA B. KNIGHT, both citizens of the United States, residing at Los Angeles, in the county of Los Angeles and State of California, have invented a new and useful Beet-Harvester, of which the following is a specification.

This invention relates to beet harvesters and resides in the provision of a beet harvester which when driven over a row of beets will lift the beets out of the ground and carry them to topping knives where the tops are removed, in a reliable and expeditious manner so that beets may be harvested and topped in a shorter length of time and with less expense than when harvested by hand.

One of the objects of the invention is to provide a means which will grasp the beets after they have been loosened from the ground by a plow forming a part of the invention and quickly carry them to a means for removing the tops therefrom, the means for picking up the beets being rotated as the harvester is moved along the row of beets so that the harvesting operation may be quickly carried out.

The accompanying drawings illustrate the invention.

Fig. 3 is an enlarged vertical sectional view showing the front part of the harvester broken away and the plow and the means to pick up the beets in operative position.

Fig. 4 is a top plan view of the frame showing parts in section and the means for picking up the beets removed.

Fig. 5 is an enlarged side elevation of the means for picking up the beets.

Fig. 6 is a front elevation of the means shown in Fig. 5; and

Fig. 7 is a vertical sectional view taken on line 6—6 of Fig. 5.

Figure 1:
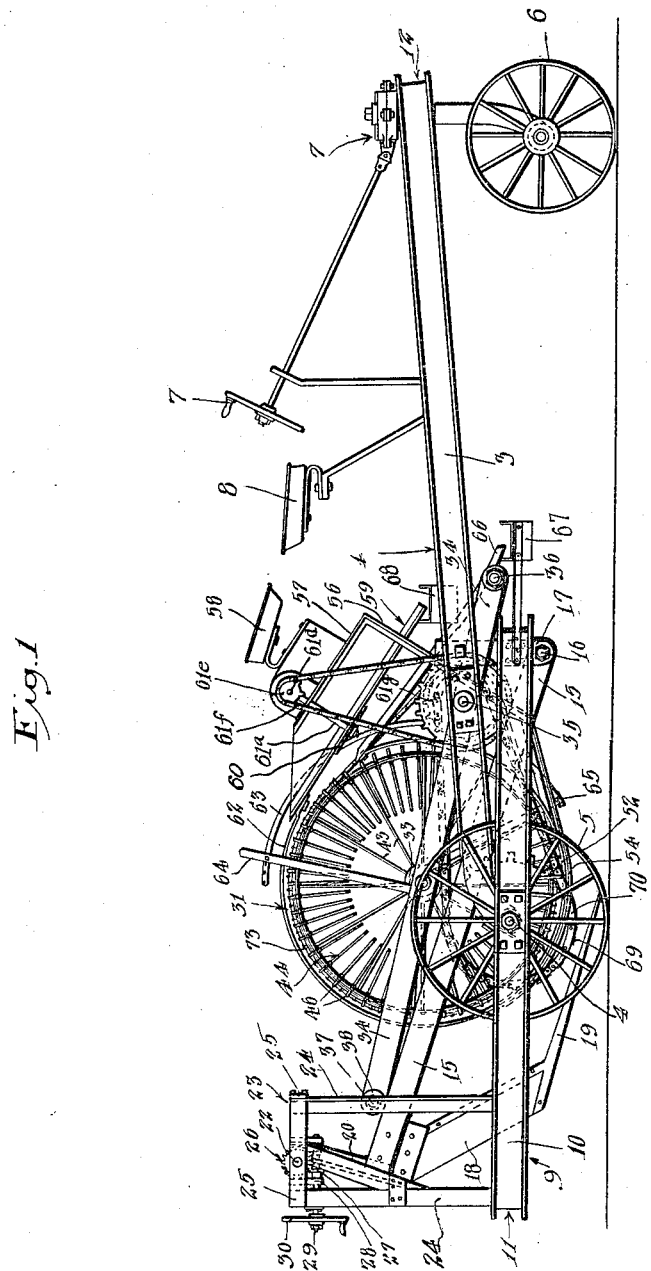
Figure 1 is a side elevation of a beet harvester constructed in accordance with the invention, showing the plow and means for picking up the beets in up or out-of-the-way positions.
Figure 2:
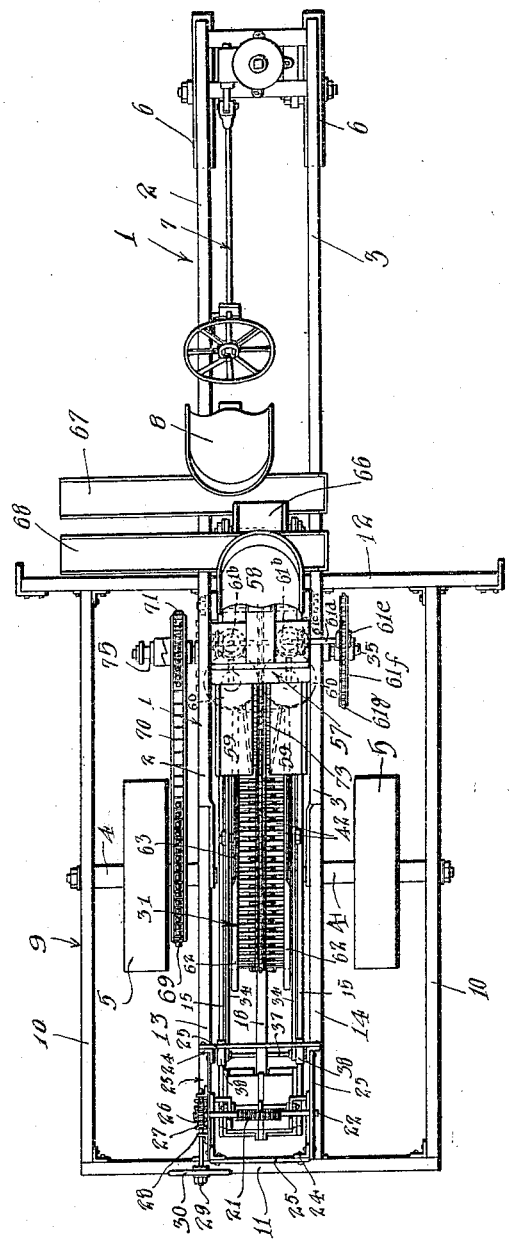
Fig. 2 is a top plan view of the beet harvester.

Referring to the drawings, 1 designates as an entirety a frame comprising parallel longitudinal bars 2 and 3 which extend for approximately the entire length of the harvester and at their rear ends are curved downwardly and connected with axles 4. Wheels 5 are mounted upon the axles 4 and at the forward ends of the bars 2 and 3 steering wheels 6 are mounted, suitable steering means 7 being provided to operate the wheels. A driver's seat 8 is carried by the bars 2 and 3 and located adjacent the steering means 7.

A rectangular frame 9 comprising side bars 10 and end bars 11 and 12 is mounted upon the axles 4, the axles being extended through the side bars 10 at points approximately centrally of the ends of said bars. The frame 9 lies in a horizontal plane below the bars 2 and 3 of the frame 1 and includes longitudinal supporting bars 13 and 14, the ends of which are secured to the bars 11 and 12. The axles 4 are secured to and located between the bars 13 and 10 and 14 and 10.

There is provided a means for loosening or plowing a row of beets so that they may be readily picked up by the means for picking up the beets which will be later more fully described. Parallel plow beams 15 are pivoted at 16 near their forward ends to hangers 17 secured to the longitudinal supporting bars 13 and 14 of the frame 9 and extend longitudinally of the frame 9 to a point adjacent to the end bar 11. Rigidly secured to the rear end of the beam 15 is a downwardly and forwardly inclined plow supporting member 18 carrying a flat substantially horizontal plow blade 19. Extending upwardly from the parallel beams 15 are short beams 20 to which is secured a link chain 21. The chain 21 is connected with a shaft 22 journaled in the upper end of an upright frame 23 which is carried by the frame 9 and secured to the bars 13 and 14 thereof. The frame 23 comprises upright opposed bars 24 and horizontal connecting bars 25. The shaft 22 is journaled between certain opposed bars 25 and has a worm wheel 26 fixed thereto. The worm wheel 26 meshes with a worm wheel 27 supported in bearings 28 depending from the bars 25 and a shaft 29 for the worm 27 has a hand wheel 30 secured thereto so as to provide for the rotation of the worm 27, worm wheel 26 and shaft 22.

There is provided a means for picking up the beets and carrying them to the topping knives which is in the form of a wheel 31 having its hub 32 mounted upon a shaft 33. The shaft 33 is journaled in parallel supporting bars 34 which are pivoted upon a shaft 35 which is journaled between and in the arms 2 and 3 of the frame 1. The forward ends of the bars 34 are connected by connecting rods 36 and the rear ends by connecting rods 37. Rollers 38 are mounted upon the rods 37 and are adapted to be engaged by the plow beams 15 when the latter are raised to lift the plow out of the ground, so that the rear end of the bars 34 will be lifted and the picking means moved into up position.

The wheel 31 comprises three rings 39, 40 and 41, the one 41 being located between the rings 39 and 40. A plurality of equidistantly spaced metal slats 42 are riveted to the rings 39 and 40 and hold them in assembled relation. Spokes 43 radiate from the hub 32 and are secured to certain of the slats 42. A plurality of beet gripping or clamping members are carried by the wheel 31, the members being mounted in the spaces between the slats 42 and secured to the rings 39 and 40. Each of these members comprises a U-shaped spring metal rod 44 which has one of its arms 45 formed longer than the other and provided at its free end with a right angularly bent pointed portion or jaw 46. The other arm 47 of each member 44 is screw-threaded and inserted through the slats 42 and rings 39 and 40. Nuts 48 are turned on the screw-threaded ends and hold the members 44 in place. Shoulders 49 are formed adjacent to the inner ends of the screw-threaded portions of the arms 47 and abut the inner faces of the slats 42. A pair of members 44 is mounted in each space between the slats 42 so that the longer arms 45 are opposed to one another and the jaws 46 are only slightly spaced from one another as shown in Figs. 6 and 7 of the drawings. The jaws 46 of each pair of clamping members act to grip and pick up a beet as will be later more fully described.

In order to spread the members 44 apart, that is the arms 45 thereof, so that when allowed to come together they will clamp and pick up the beets, there are provided spreading means comprising arcuate cam bars 50 and 51 which are mounted upon one side of the wheel and extend around substantially one-half the circumference thereof. These bars are suitably supported in spaced relation to the slats 42 between the portions 46 of the members 44 and slats, as shown in Figs. 5, 6 and 7 of the drawings, and hold the arms 45 spaced apart until the lower ends of the bars 50 and 51 are reached, at which point the bars are curved inwardly toward one another or converge as at 52 so that at the lowermost point or approximately the lowermost point of the wheel the arms 45 will spring together and effect the clamping action. At their upper ends the bars 50 and 51 are curved inwardly or converged as at 53, so that the arms 45 will be spread apart at a point near the upper side of the wheel and held apart until they pass off of the bars 50 and 51, as previously described.

Guide members 54 are secured to the bars 50 and 51 adjacent to the lower ends of said bars and are adapted to engage the beets and hold or guide them in such position that they will be clamped and picked up by the members 44 during the operation of the harvester. These guide members 54 are provided with laterally extending flanges 55 which are extended from the lower ends of the guide members in the form of rearwardly and upwardly curved skids 54ª and said guide members 54 are secured to upright bars 56 forming a part of a frame 57 designed to support the means for topping the beets and the operator's seat 58. The frame 57 supports forwardly and downwardly inclined guide plates 59 which are spaced apart so as to receive the tops of the beets therebetween. Opposed topping knives 60 having their adjacent edges located in the space between the plates 59 are carried upon the frame 57 and driven by suitable means 61. The means 61 comprise shafts 61ª carried by the frame 57 and supporting the topping knives 60. Pinions 61ᵇ are secured to shafts 61ª and mesh with pinions 61ᶜ on a shaft 61ᵉ, being rotated by sprocket 61ᵈ thereon and a chain 61ᶠ carried on the sprocket and a sprocket 61ᵍ fixed to the shaft 35. A guard member 62 is secured to the upper ends of the plates 59 and extends around the wheel at a point sufficiently spaced from the members 45 so as not to interfere with the beets held thereby. A similar guard member 63 surrounds the upper and forward portions of the wheel 31 and is held in position by bars 64 and 65 which are secured to the shaft 33.

There is provided a chute 66 for receiving the beet tops, said chute being located beneath the guide plates 59 and knives 60 and inclined downwardly and forwardly. The lower end of the chute 66 discharges into a transversely mounted discharge chute 67. A similar discharge chute 68 is carried by the frame 1 and receives the beets discharged from the guide plates 59.

As a means for driving the wheel 31 in a clockwise direction, there is provided a large sprocket wheel 69 which is secured to one of the wheels 5 and carries a large sprocket chain 70. The chain 70 meshes with a small sprocket wheel 71 fixed to the shaft 35. The ring 41 of the wheel 31 is provided with a series of equidistantly spaced lugs 72 thereon, upon which are mounted the links of a chain 73 that surrounds the wheel 31. This chain is rove around a sprocket 74 which is fixed to the shaft 35. It will be seen that upon forward movement of the harvester the rotation of the wheels 5 will cause a clockwise rotation to be imparted to the wheel 31 through the shafts, sprockets and chains hereinbefore described. A suitable clutch means 75 may be mounted upon the shaft 35 and associated with the shaft and sprocket wheel 71 so as to provide for the free rotation of the sprocket wheel 71 upon the shaft. Suitable means, not shown, may be provided to operate the clutch means 75.

In operation, assuming that the plow 19 and wheel 31 are elevated and in the position shown in Fig. 1 of the drawings, the harvester is drawn over a row of beets and by the proper manipulation of the hand wheel 30, the shaft 22 is rotated to permit the chain 21 to unwind and lower the plow beams 15 and plow 19. When this takes place the bars 34 which are supported in up position by the plow beams 15 are allowed to move downwardly until the skids 56 and guide member 54 rest upon the ground. At this time the bars 34 are in approximately horizontal position, as shown in Fig. 3 of the drawings. The clutch means is then operated to throw the wheel 31 into gear and when the harvester is moved along the row of beets the plow 19 will loosen and elevate the beets from the ground so that as the guide members 54 pass over the beets they will be held upright until the clamping members 44 operate to clamp and pick up the beets. As each clamping member 44 passes from engagement with the cam bars 50 and 51 the arms 45 of the members 44 spring together and clasp or clamp the beets at points near the tops thereof, as shown in Fig. 3 of the drawings. As the wheel 31 rotates in clockwise direction the beets are carried to encounter the guide plates 59 and pass into the space between the guide plates. At this time the arms 45 carrying the beets encounter the converging upper ends 53 of the cam bars 50 and 51 and said arms are forced apart, releasing the beets. The operator takes his position at the seat 58 and may guide the beets between the guide plates 59 into engagement with the topping knives 60. It will be noted that the beets will be automatically forced into the spaces between the guide plates and the operator need only move the beets in case of a jam or failure of the beets to move into position automatically. The knives 60 operate to quickly remove the tops which drop into the chute 66 and from thence discharge into the discharge chute 67. The beets will roll downwardly into the discharge chute 68 and a wagon or a small conveyance, not shown, may operate alongside of the harvester so as to receive the beets or tops discharged from the chutes 67, 68. The wheel 31 is so mounted that should it encounter an obstruction it will give upwardly and not cause derangement thereof. The depth of the plow 19 may be regulated as desired depending upon the character of the ground and beets. The provision of the great number of clamping members insures the picking up of all of the beets and the relatively long pointed portions or jaws 46 of the arms 45 extend into the beets sufficiently far to firmly hold them.

One of the most essential features of the invention is the wheel for clamping and picking up the beets which will operate effectively to save a great deal of time and labor in connection with the harvesting of beets.

We claim:

1. In a beet-harvester, a frame, a wheel rotatably mounted on the frame, beet clamping members carried by the wheel, means to rotate the wheel, said clamping members being normally in clamped position, means to force said members apart and then allow them to move together to clamp beets, and rearwardly and upwardly curved skids having their under faces adapted for engaging the surface of the ground on opposite sides of the lowermost point of the wheel to dispose beets into position to be clamped by the clamping arms at the time said arms are allowed to move together.

2. In a beet harvester, a frame, a means for picking the beets from the ground carried by the frame and comprising a wheel, a plurality of equidistantly spaced slats mounted on the periphery of the wheel transversely thereof, a pair of U-shaped resilient clamping members mounted in the spaces between the slats, means to secure the ends of the outermost arms of the clamping members to the wheel, the opposed inner arms of the clamping members of each pair being longer than the other arms and extending between the slats outwardly therefrom, and a cam means for forcing the arms apart and releasing them at points adjacent the lower side of the wheel whereby beets will be clamped by the arms and removed from the ground upon rotation of the wheel.

3. In a beet harvester, a frame, a means for picking the beets from the ground carried by the frame and comprising a wheel, a plurality of equidistantly spaced slats mounted on the periphery of the wheel transversely thereof, a pair of U-shaped resilient clamping members mounted in the spaces between the slats, means to secure the ends of the outermost arms of the clamping members to the wheel, the opposed inner arms of the clamping members of each pair being longer than the other arms and extended between the slats outwardly therefrom, and a cam means for forcing the arms apart and releasing them at points adjacent the lower side of the wheel whereby beets will be clamped by the arms and removed from the ground upon rotation of the wheel, said opposed arms having laterally extending opposed pointed portions adapted to grip the beets.

4. In a beet harvester, a wheeled frame, a rotary wheel mounted upon the frame, means carried upon the periphery of the wheel to clamp and pick beets from the ground during rotation of the wheel, means to rotate the wheel, spaced guide plates carried on the frame at the upper side of the wheel and adapted to receive beets therebetween, and means to release the beet clamping means relative to the beets after the latter have been moved between the spaced guide plates.

5. In a beet harvester, a wheeled frame, a rotary wheel mounted upon the frame, means carried upon the periphery of the wheel to clamp and pick beets from the ground during rotation of the wheel, means to rotate the wheel, spaced guide plates carried on the frame at the upper side of the wheel and adapted to receive beets therebetween, means to release the beet clamping means relative to the beets after the latter have been moved between the spaced guide plates, and means located adjacent the spaced guide plates to remove the tops of the beets as the beets are moved between the guide plates.

6. In a beet harvester, a wheeled frame, a rotary wheel mounted upon the wheeled frame, a plurality of beet clamping members carried upon the periphery of the rotary wheel, means to rotate the wheel, said wheel and the beet clamping means being spaced from the ground, and means carried by the wheeled frame and having sliding engagement with the ground on opposite sides of the lower side of the wheel for guiding beets into position to be clamped and picked up by the beet clamping members.

7. In a beet harvester, a wheeled frame, a rotary wheel mounted upon the wheeled frame, a plurality of beet clamping members carried upon the periphery of the rotary wheel, means to rotate the wheel, said wheel and the beet clamping means being spaced from the ground, means carried by the wheeled frame and having sliding engagement with the ground on opposite sides of the lower side of the wheel for guiding beets into position to be clamped and picked up by the beet clamping members, and a plow carried by the frame and extending beneath the wheel for loosening the beets.

8. In a beet harvester, a wheeled frame, a beet clamping means carried by the frame, and upwardly and rearwardly curved skids carried by the wheeled frame and having their under faces adapted to come into engagement with the surface of the ground on opposite sides of the lowermost point of the beet clamping means so as to guide beets into position to be clamped.

9. In a beet harvester, a wheeled frame, a beet clamping means carried by the frame, means carried by the wheeled frame and having engagement with the ground on opposite sides of the lowermost point of the beet clamping means so as to guide beets into position to be clamped, and a plow carried by the frame and extending from a point in the rear of to a point under the last named means and the beet clamping means.

10. In a beet harvester, a frame, an endless carrier mounted on the frame, resilient beet clamping arms mounted on the endless carrier in two opposed series normally tending to be held toward one another, means to operate the carrier to move the beet clamping arms, means to guide the beets into the path of movement of the beet clamping arms, and means adjacent the beet guiding means and adjacent another portion of the carrier to spread the opposed arms apart as said arms travel past said means.

In testimony whereof, we have hereunto set our hand at Los Angeles, California, this 26th day of February, 1917.

SAMUEL C. BEALE.
ANNA B. KNIGHT.

In presence of—
CHAS. J. CHUNN,
L. BELLE WEAVER.

Copies of this patent may be obtained for five cents each, by addressing the "Commissioner of Patents, Washington, D. C."